(12) United States Patent
Nation

(10) Patent No.: US 7,100,662 B2
(45) Date of Patent: Sep. 5, 2006

(54) GOLF CART CLUB BAG PROTECTION DEVICE

(75) Inventor: Roger F. Nation, Brandon, FL (US)

(73) Assignee: Annwil Inc., Tampa, FL (US)

( * ) Notice: Subject to any disclaimer, the term of this patent is extended or adjusted under 35 U.S.C. 154(b) by 83 days.

(21) Appl. No.: 10/774,975

(22) Filed: Feb. 9, 2004

(65) Prior Publication Data
US 2005/0173076 A1   Aug. 11, 2005

(51) Int. Cl.
*E04F 10/02* (2006.01)

(52) U.S. Cl. .............. 160/56; 135/88.01; 296/100.14

(58) Field of Classification Search .......... 160/45, 160/56, 57, 77, 351; 296/100.14; 135/88.01, 135/88.05
See application file for complete search history.

(56) References Cited

U.S. PATENT DOCUMENTS

| | | | |
|---|---|---|---|
| 208,564 A | 10/1878 | Bowers | |
| 1,722,533 A * | 7/1929 | McWane | 135/88.01 |
| 2,249,491 A * | 7/1941 | O'Brien | 160/56 |
| 2,551,975 A * | 5/1951 | Scott | 160/56 |
| 2,689,579 A | 9/1954 | Sartori | |
| 4,830,037 A | 5/1989 | Held | |
| 5,069,481 A | 12/1991 | Strange | |
| 5,688,018 A | 11/1997 | Simpson | |
| 6,007,134 A | 12/1999 | Weston | |
| 6,076,206 A | 6/2000 | Celaya | |
| 6,216,714 B1 | 4/2001 | Tucker | |
| 6,220,647 B1 | 4/2001 | Winkler | |
| 6,227,217 B1 | 5/2001 | Peta | |
| 6,227,603 B1 | 5/2001 | Brock | |
| 6,416,109 B1 | 7/2002 | Tyrer et al. | |
| 6,471,281 B1 * | 10/2002 | Tyrer et al. | 296/100.11 |
| 6,481,780 B1 | 11/2002 | Dolan et al. | |
| 6,547,312 B1 | 4/2003 | Winkler | |
| 6,601,904 B1 | 8/2003 | Winkler | |
| 6,663,161 B1 | 12/2003 | Tyrer | |
| 6,663,162 B1 | 12/2003 | Tyrer | |
| 2002/0129846 A1 * | 9/2002 | True et al. | 135/88.05 |

* cited by examiner

*Primary Examiner*—Blair M. Johnson
(74) *Attorney, Agent, or Firm*—The Livingston Firm; Edward M. Livingston; Angela M. Miller

(57) ABSTRACT

A golf cart club bag protection device having a folding canopy which allows other accessories, such as coolers and sand bottles, to be mounted underneath. The device has four components: a securing frame (1), an attachment bar (22), canopy support bars (2) and (3) and a canopy (4), (5) and (16). The securing frame (1) is shaped so as to have two vertical legs (21) and a horizontal top bar (23) while the attachment bar (22) has a unique shape so as to raise the pivotal point of the device. Tabs (8) are located at the base of the legs (21) wherein the support bars (2) and (3) are pivotally attached to the securing frame (1). The attachment bar (22) has two C-shaped clamps (6) which are used to secure the securing frame (1) to the golf bag support bar (18). The horizontal top bar (23) has a canopy holder (11) which holds the removably attached canopy (4), (5) and (16), a canopy flap (13) and a canopy fastener (15) in order for the user to keep the golf cart club bag protection device in an upright position.

15 Claims, 4 Drawing Sheets

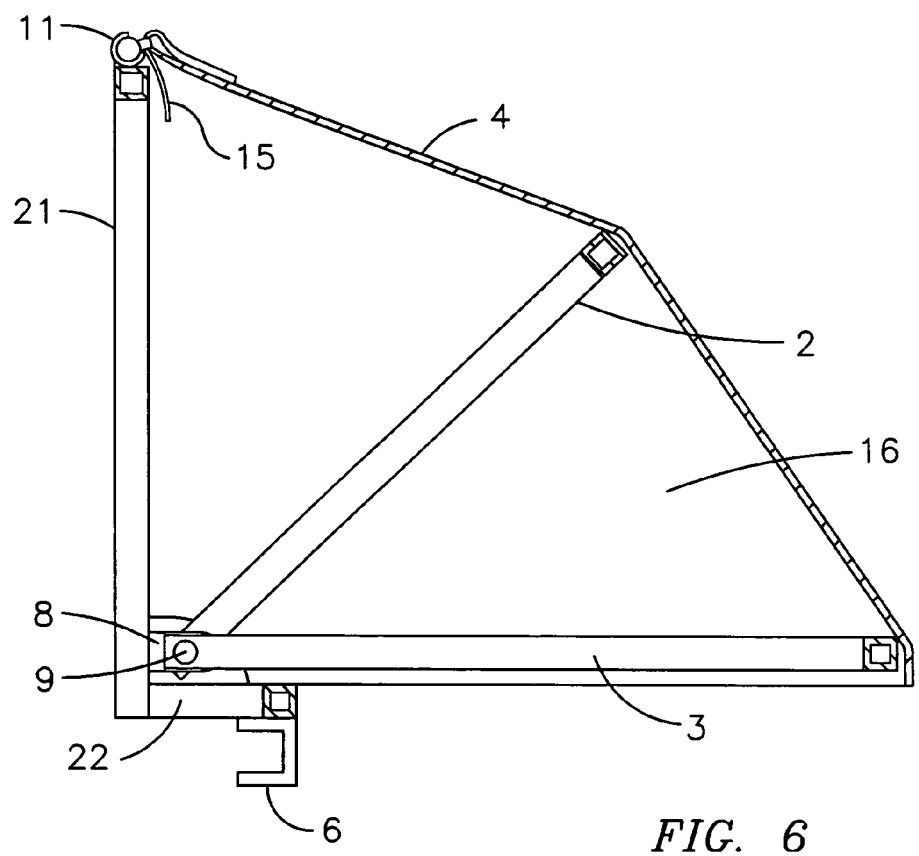
FIG. 6
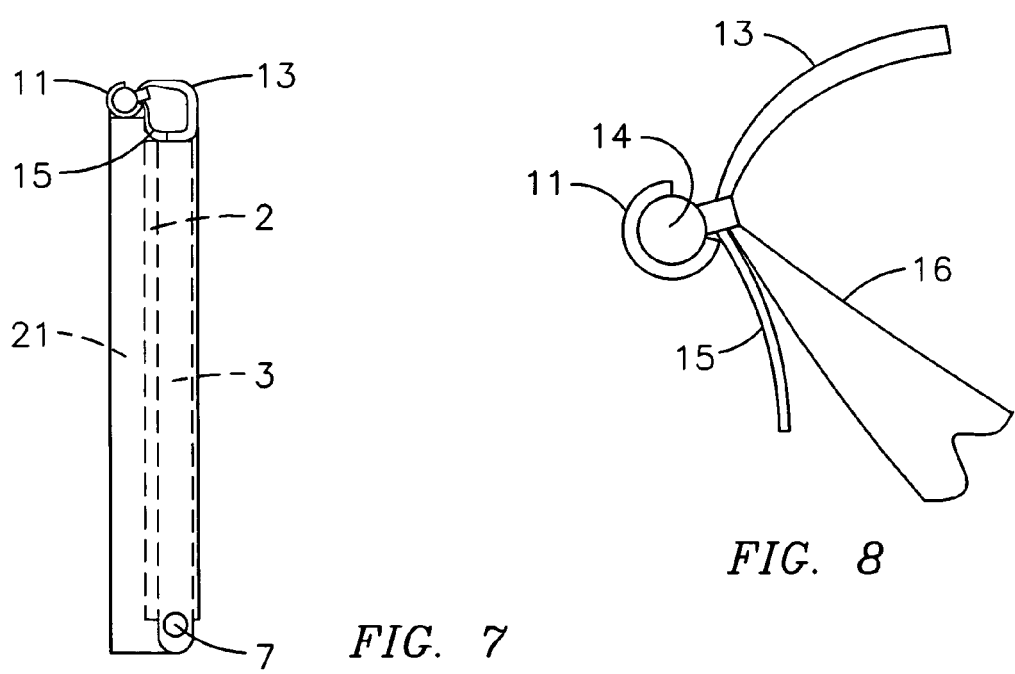
FIG. 7
FIG. 8

GOLF CART CLUB BAG PROTECTION DEVICE

BACKGROUND OF THE INVENTION

This invention relates to golf cart club bag covers, more specifically, a golf cart club bag protection device having a folding canopy which allows other accessories, such as coolers and sand bottles, to be mounted underneath the device.

The use of golf carts has become commonplace in the game of golf. Golf carts have not only permitted golfers to get to the next hole quicker, but have also allowed golfers to bring along more items to the course to make the game more enjoyable, such as more clubs, tees, golfballs, beverages, sand bottles and the like. The golfers simply place the items in the back of the golf cart and drive the cart from hole to hole, enjoying the game of golf.

However, a perfect golfing day can quickly change into an imperfect day when inclement weather occurs. Although most golf carts have roofs which provide some shelter from rain for the players, all of the items in the back of the golf car are susceptible to being rained upon. The rain could not only damage the items in the back of the cart, but it could also ruin them altogether as well. This is especially unfortunate when the items ruined includes expensive golf clubs.

However, in order to protect these items, golf cart club bag protection devices have been created. Currently, there many golf cart club bag cover protection devices in use. However, major disadvantages to using the current devices is that they either must be attached to the golf cart roof, are difficult to use or impede the amount of storage space beneath the cover. In addition, many of the currently used cover devices require some sort of modification or alteration to the golf cart in order to secure the cover device to it. Not only is this difficult, but it could also affect the aesthetic appearance of the golf cart.

Thus, the need for a golf cart club bag protection device which has an easy to use folding canopy which allows other accessories to be mounted underneath the cover and does not require modification to the golf cart is needed.

The relevant prior art includes the following patents:

| Patent No. (U.S. unless stated otherwise) | Inventor | Issue Date |
| --- | --- | --- |
| 6,663,161 | Tyrer | Dec. 16, 2003 |
| 6,663,162 | Tyrer | Dec. 16, 2003 |
| 6,416,109 | Tyrer et al. | Jul. 09, 2002 |
| 6,601,904 | Winkler | Aug. 05, 2003 |
| 6,547,312 | Winkler | Apr. 15, 2003 |
| 6,481,780 | Dolan et al. | Nov. 19, 2002 |
| 6,227,217 | Peta | May 08, 2001 |
| 4,830,037 | Held | May 16, 1989 |
| 6,220,647 | Winkler | Apr. 24, 2001 |
| 208,564 | Bowers | Oct. 01, 1878 |
| 5,069,481 | Strange | Dec. 03, 1991 |
| 6,227,603 | Brock | May 08, 2001 |
| 6,076,206 | Celaya | Jun. 20, 2000 |
| 5,688,018 | Simpson | Nov. 18, 1997 |
| 6,216,714 | Tucker | Apr. 17, 2001 |
| 6,689,579 | Sartori | Sep. 21, 1954 |
| 6,007,134 | Weston | Dec. 28, 1999 |

Although the above patents teach various types of golf cart club bag protection devices, none teach a golf cart club bag protection device designed to have a folding canopy which allows other accessories, such as coolers and sand bottles, to be mounted underneath the cover.

SUMMARY OF THE INVENTION

The primary object of the present invention is to provide a golf cart club bag protection device that has a folding canopy.

A further object of the present invention is to provide a golf cart club bag protection device that allows other accessories, such as coolers and sand bottles, to be mounted underneath the cover.

An even further object of the present invention is to provide a golf cart club bag protection device that is easy to use.

A further object of the present invention is to provide a golf cart club bag protection device that is durable.

An even further object of the present invention is to provide a golf cart club bag protection device that is easy to attach to a golf cart.

A further object of the present invention is to provide a golf cart club bag protection device that can be attached to a golf cart without altering or modifying the golf cart.

The present invention fulfills the above and other objects by providing a golf cart club bag protection device comprised of four components: a securing frame, an attachment bar, canopy support bars and a canopy. The securing frame is shaped so as to have two vertical legs and a horizontal top bar. An attachment bar is attached to the vertical legs at a predetermined distance above the base of the legs. The attachment bar has a unique shape so as to raise the pivotal point of the device to allow more items to be mounted in a golf cart storage area. Tabs are located at the base of the legs wherein the support bars are pivotally attached to the securing frame. The bottom of the attachment bar has two C-shaped clamps which are used to secure the securing frame to the golf cart bag holder. The securing frame, attachment bar and canopy support bars are made of a rigid and durable material, preferably steel, so as to withstand rain and other outdoor elements, such as wind and hail, without affecting the structure of the securing frame and bars. The top of the securing frame has a canopy holder which holds the canopy to the securing frame. The canopy, preferably made of a waterproof material, is attached to the canopy support bars and is removably attached to the legs of the securing frame by using fastening means, preferably hook and loop type fastening material. The canopy holder also contains a canopy flap and a canopy fastener to allow the user to keep the golf cart club bag protection device in an upright position.

To use the present invention, the user first takes the securing frame and positions the C-shaped clamps around the golf bag support bar so the legs of the securing frame are flush with the golf cart support bar. The user then inserts a long bolt into the holes located on the C-shaped clamps and uses threaded nuts and bolts to secure the securing frame onto the golf bag support bar. The user then takes the sides of the canopy and fastens each side to the securing frame by using a fastening means, such as hook and loop type fastening material. When the user desires the canopy to be down, he or she simply grabs the bottom canopy support bar and pulls downward. To raise the canopy, the user simply pushes the bottom canopy support bar upwards. In addition, the user can keep the canopy in an upright position by using the canopy flap and canopy fasteners. The flap has a fastening means, preferably snaps, while the canopy fasteners have the corresponding fastening means. While the canopy support bars are in the upright position, the user positions the canopy flap so it is extending away from the securing frame. The user then takes the canopy fasteners and matches the fastening means on the fasteners to the fastening means on the flap.

Because the frame is constructed so as to freely stand against the cart support bar, no modifications to the golf cart are necessary for the installation of the present invention. In addition, because the pivoting point of the canopy support bars are located at a distance above attachment area, more room is available in the golf cart storage area for other items, such as coolers and/or sand bottles, to be mounted.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 6 is a cut-away view along the lines 6—6 of the embodiment of FIG. 1;

FIG. 7 is a side view of the present invention when compressed;

FIG. 8 is a side view of the canopy holder of the present invention;

DESCRIPTION OF THE PREFERRED EMBODIMENTS

Figure 1:
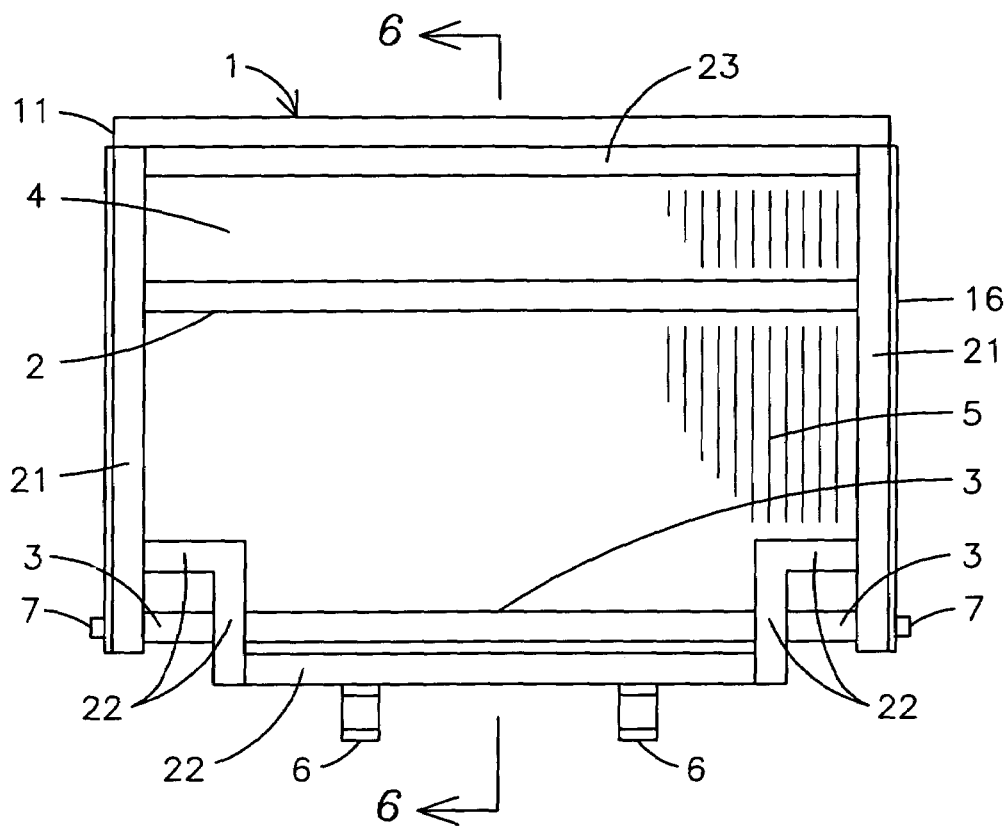
FIG. 1 is a frontal view of the golf cart club bag protection device of the present invention.

For purposes of describing the preferred embodiment, the terminology used in reference to the numbered components in the drawings is as follows:
1. securing frame
2. middle canopy support bar
3. bottom canopy support bar
4. canopy top edge
5. canopy bottom edge
6. C-shaped clamp
7. bolt
8. frame structure tab
9. nut
10. fastening means
11. canopy holder
12. hole
13. canopy flap
14. rod
15. canopy fastener
16. canopy side
17. golf cart support bar
18. golf bag support bar
19. storage area
20. golf cart seat
21. legs
22. attachment bar
23. horizontal top bar With reference to FIG. 1, a frontal view of the golf cart club bag protection device of the present invention is shown. The golf cart club bag protection device has a securing frame 1, an attachment bar 22, canopy support bars 2 and 3 and a canopy with a top edge 4, a rear edge 5 and two sides 16. The securing frame 1 has a canopy holder 11, a horizontal top bar 23 and two legs 21 which extend downward. The attachment bar 22 is affixed to the inner legs 21 of the securing frame 1 at a predetermined distance above the ends of the legs 21. From the attachment point with the legs 21, the attachment bar 22 extends inward towards the center line of the protection device on both sides to a predetermined length wherein the attachment bar 22 then turns downward, preferably at a ninety degree angle. The attachment bar 22 then extends away from the securing frame 1, preferably at a ninety degree angle, so the attachment bar 22 is now parallel to the ground. The attachment bar 22 then has one more ninety degree angle turn wherein each end of the attachment bar 22 then connects with one another to form one continuous attachment bar 22. At the base of the attachment bar 22 are two C-shaped clamps 6 which are sized slightly larger then the height of a standard golf bag support. A bolt head 7 indicates the pivoting point of the middle support bar 2 and bottom support bar 3. A canopy top edge 4 covers the space between the securing frame 1 and the middle canopy support bar 2 while a canopy rear edge 5 covers the space between the middle canopy support bar 2 and the bottom canopy support bar 3. Preferably, only the canopy rear edge 5 is transparent so as to allow the user to have rear view through the back of the golf cart. The canopy top edge 4 is preferably opaque so as prevent the golf clubs from being exposed to sun's rays. Although the present invention is shown with only one middle canopy support bar 2, the present invention could be utilized with a plurality of middle canopy support bars added thereto. It is to be understood that the canopy top edge 4 will cover the exposed portions located between the securing frame 1 and the middle canopy support bars while the canopy rear edge 5 will cover the exposed portions located between the bottom canopy support bar 3 and the nearest middle canopy support bar.

Figure 2:
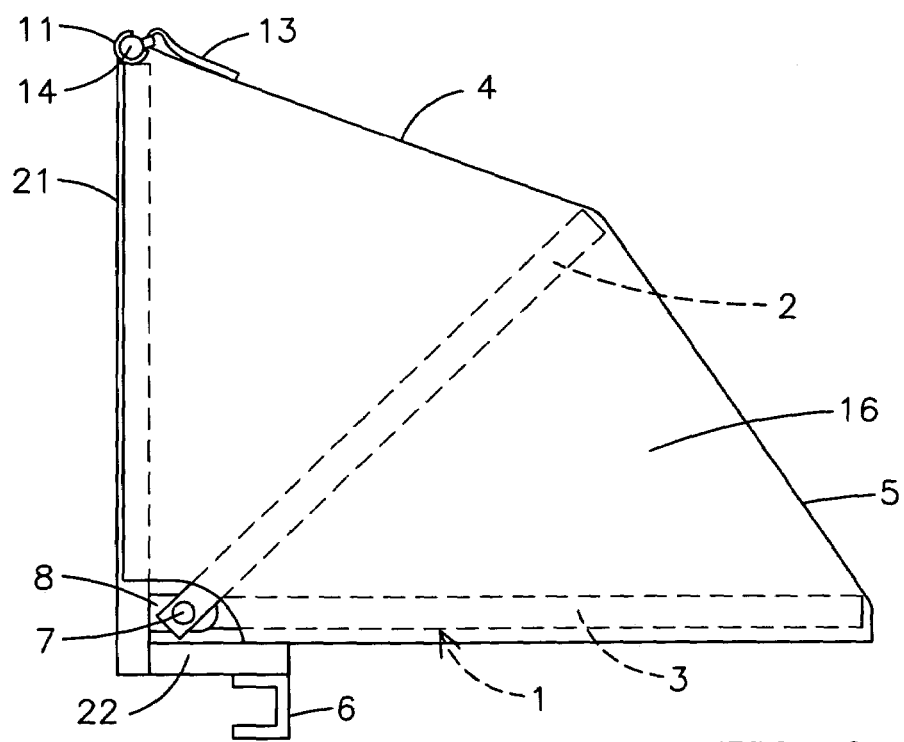
FIG. 2 is a side view of the embodiment of FIG. 1.

With reference to FIG. 2, a side view of the embodiment of FIG. 1 is shown. The canopy holder 11 is C-shaped and holds the rod 14. The rod 14, in turn, has attached to it the canopy flap 13, the canopy sides 16, the canopy top edge 4 and the canopy rear edge 5. The side canopy 16 covers the lateral spaces between the legs of the securing frame 21, the middle canopy support bar 2 and the bottom canopy support bar 3 without covering the bolt head 7. The bolt head 7 indicates the area where the tab 8 located on the legs of the securing frame 21, the middle canopy support bar 2 and the bottom canopy support bar 3 are pivotally attached to one another.

Figure 3:
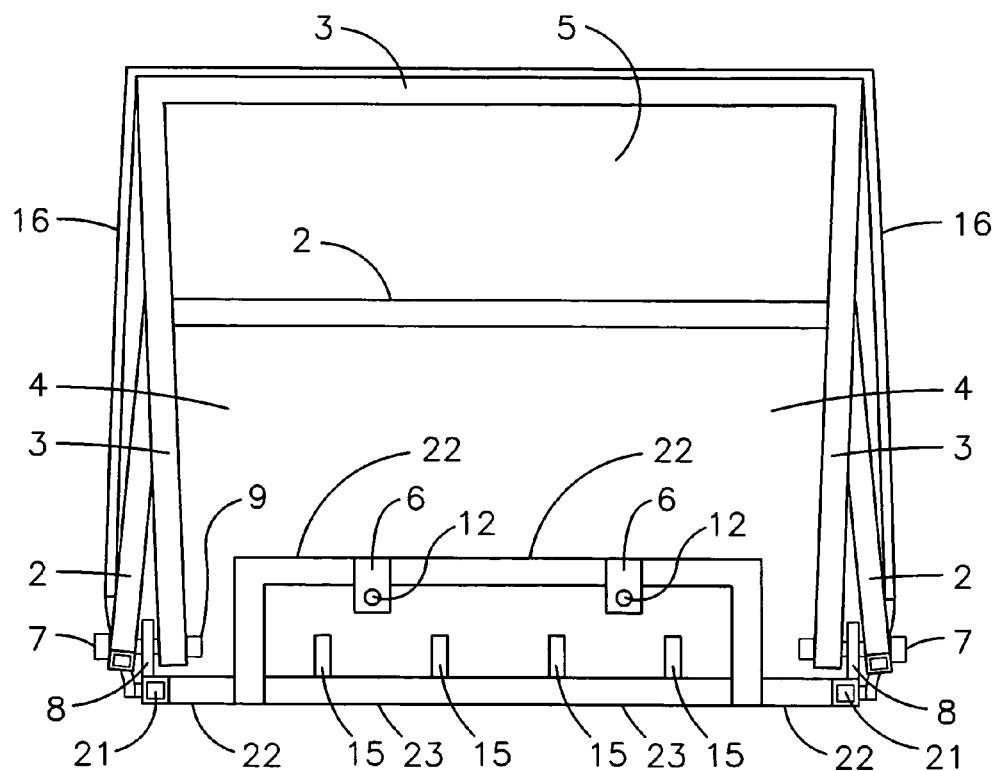
FIG. 3 is upwardly-looking view of the embodiment of FIG. 1.

In FIG. 3, an upwardly-looking view of the embodiment of FIG. 1 is shown. The attachment bar 22 has C-shaped clamps 6 for securing the golf cart club bag protection device to a golf cart. Canopy fasteners 15 are attached to the rod 14, which wherein the rod 14 is then inserted into the canopy holder 11 on the securing frame 1. Frame structure tabs 8 are located on both legs 21. To pivotally attach the canopy support bars 2 and 3 to the securing frame 1, a nut and bolt 7 and 9 are used. From the inner portion of the golf cart club bag protection device extending outward, the bottom canopy support bar 3, the frame structure tab 8 and the middle canopy support bar 2 are joined together by the nut and bolt 7 and 9 to give the device its pivotal nature.

Figure 4:
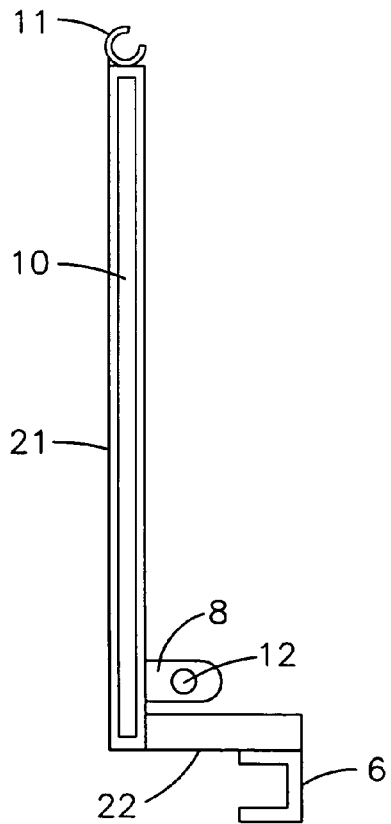
FIG. 4 is a side view of the leg of the securing frame of the present invention without a canopy.

In FIG. 4, the leg of the securing frame of the present invention without a canopy or canopy support bars is shown. The leg 21 has a fastening means 10, preferably hook and loop type fastening material, attached thereto along its side and a C-shaped canopy holder 11 located at the top of the leg 21. The leg 21 also has frame structure tab 8 located at the bottom and extending away from the leg 21. The attachment bar 22 extends below the leg 21 and has located thereupon a C-shaped clamp 6. The C-shaped clamp 6 allows for the securing of the present invention to the golf bag support bar 18 located on golf carts. The hole 12 in the frame structure tab 12 indicates where a nut 9 and bolt 7 would be used to act as the pivoting point of the device. The pivoting point is located at a predetermined distance above the C-shaped clamp 6 so as to yield more room for storage underneath the device as compared to current golf club cart canopies.

Figure 5:
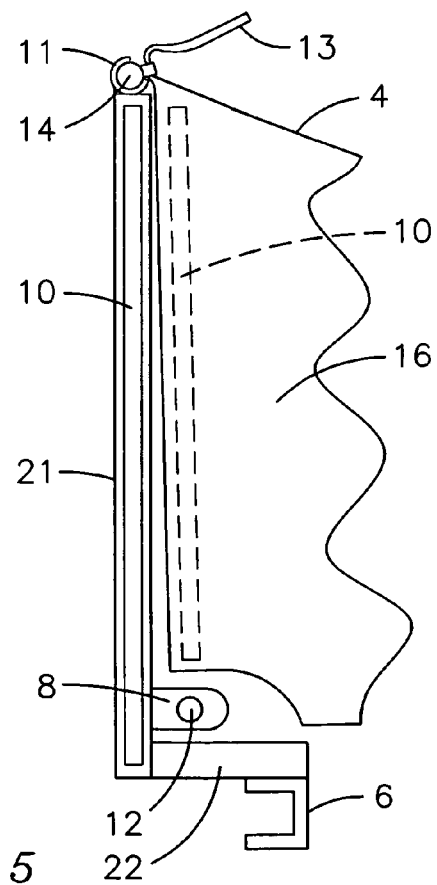
FIG. 5 is a side view of the embodiment of FIG. 4 with a canopy.

With reference to FIG. 5, a side view of the embodiment of FIG. 4 with a canopy is shown. The canopy holder 11 accommodates a rod 14 wherein attached is a canopy flap 13, the canopy sides 16, the top canopy 4 and rear canopy 5. Along the inside of the canopy side 16 is a fastening means 10 to affix the canopy side 16 to corresponding fastening means 10 located on the leg 21 of the securing frame 1. Preferably, the securing means are hook and loop type fastening material.

In FIG. 6, a cut-away view along the lines 6—6 of the embodiment of FIG. 1 is shown. Canopy fasteners 15 extend from the canopy holder 11 and have a fastening means, preferably snaps, located thereupon. A nut 9 and bolt 7 keeps the frame structure tab 8, middle support bar 2 and bottom support bar 3 together in a pivotal nature.

With reference to FIG. 7, a side view of the present invention when upright is shown. The middle canopy support bar 2 and bottom canopy support bar 3 are vertical when the canopy flap 13 is placed around the bars 2 and 3. The canopy fasteners 15 are then placed around the canopy support bars 2 and 3 and secured to the canopy flap 13 by using the fastening means, preferably snaps.

In FIG. 8, a side view of the canopy holder of the present invention is shown. The canopy holder 11 is C-shaped and is sized to accommodate a rod 14. The rod 14 has attached to it a canopy flap 13, canopy fasteners 15 and the top canopy 4, rear canopy 5 and side canopy 16, although only the side canopy 16 is shown.

Figure 9:
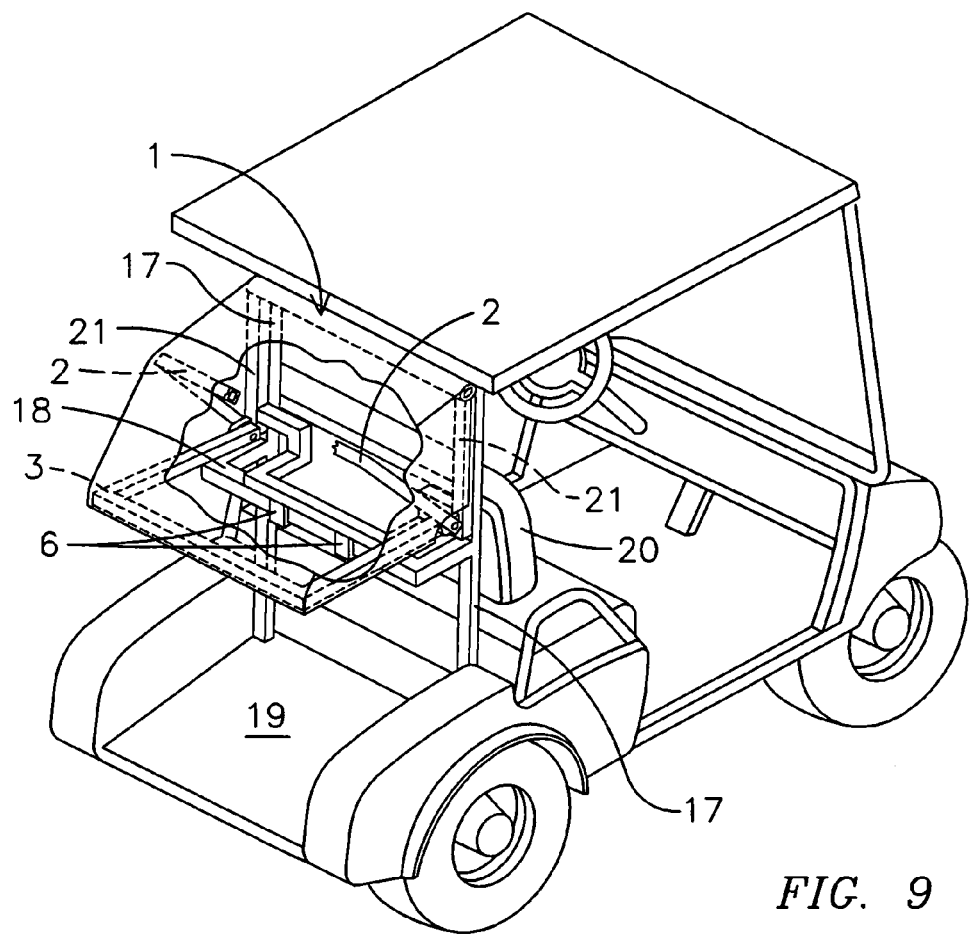
FIG. 9 is a perspective view of the present invention secured to a golf cart.

In FIG. 9, a perspective view of the present invention secured to a golf cart having a roof is shown. The golf cart has two golf cart support bars 17, a golf bag support bar 18 and a storage area 19. The golf cart club bag protection device is designed so as the legs 21 of the non-movable securing frame 1 are permanently vertical and flush against the golf cart roof support bars 17 at all times when the C-shaped clamps 6 are secured to the golf support bar 18. Thus, there is no need to secure the golf cart club bag protection device to the roof of the golf cart or, in fact, make any alterations whatsoever to the golf cart as is the case with patented inventions in the prior art.

Figure 10:
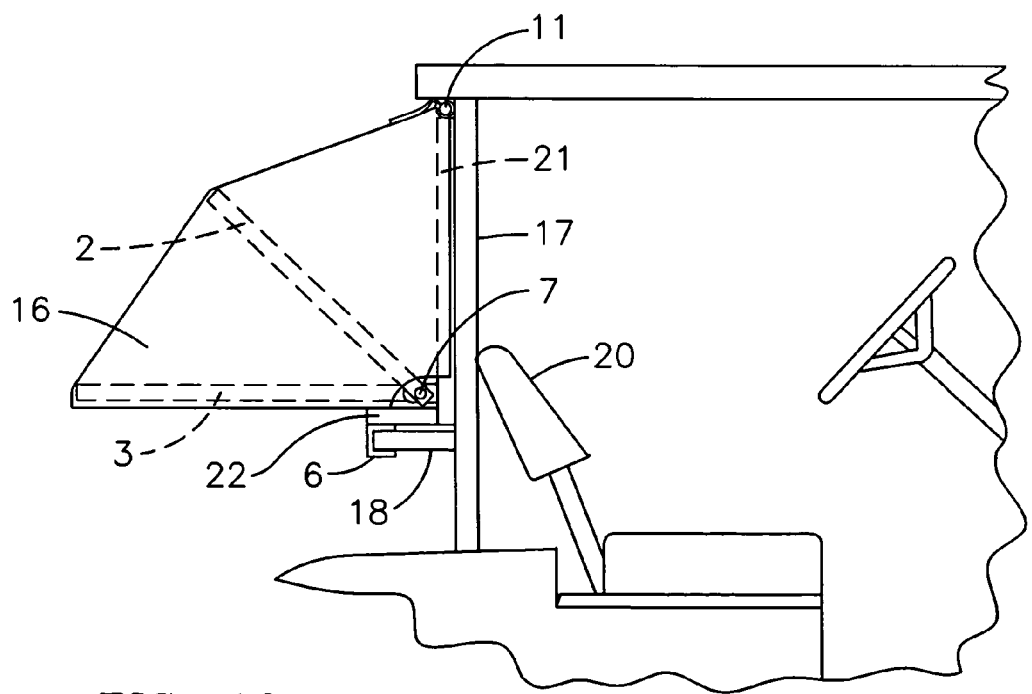
FIG. 10 is a side view of the present invention secured to a golf cart.

Finally, with reference to FIG. 10, a side view of the present invention secured to a golf cart is shown. When the present invention is installed on a golf cart, the canopy holder 11 and legs 21 are flush against the golf cart roof and golf cart support bars 17, respectively, thus, making it difficult for rainwater to enter the storage area 19. The C-shaped clamps 6 secure to the golf bag support bar 18 by using bolts 7.

The use of the present invention will allow users to mount other accessories, such as coolers and sand bottles, beneath a canopy cover which acts as a protective cover from wind, rain, sun and other elements of nature.

It is to be understood that while a certain form of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A golf cart club bag protection device comprising:
    a rigid securing frame of a predetermined shape having two vertical legs and a horizontal top bar rigidly connected to each leg;
    the legs having a base end;
    the legs having an inner side and an outer side;
    the legs of the securing frame have tabs located at the base end of the legs;
    an attachment bar fixedly attached to the inner leg sides;
    the attachment bar having a means for attaching the attachment bar to a golf cart bag support bar;
    at least one canopy support bar pivotally attached to the securing frame;
    the at least one canopy support bar is pivotally attached to the tabs;
    a canopy having a top edge, a rear edge and two sides over the at least one canopy support bar; and
    a means for attaching the canopy to the securing frame.

2. The golf cart club bag protection device of claim 1 wherein:
    the attachment bar is designed so as to be positioned above the golf cart bag support bar when affixed to the golf bag support bar.

3. The golf cart club bag protection device of claim 1 wherein:
    the means for attaching the attachment bar to the golf bag support bar is by using C-clamps;
    the C-clamps are fixedly attached to the attachment bar;
    the C-clamps have holes located thereupon;
    the C-clamps are sized so as to accommodate a height of a golf bag support bar; and
    the C-clamp holes are sized to accommodate a nut.

4. The golf cart club bag protection device of claim 1 wherein:
    the securing frame has a canopy holder fixedly attached along the top horizontal bar;
    the canopy holder is C-shaped;
    a rod attached to the canopy holder; and
    the canopy holder is sized to accommodate the rod.

5. The golf cart club bag protection device of claim 4 wherein:
    the rod attached to the canopy holder is removable;
    the rod has a canopy flap attached thereon having a size sufficient to wrap around the canopy when upright;
    the rod has a canopy attached thereon; and
    the rod has at least one canopy fastener attached thereon.

6. The golf cart club bag protection device of claim 5 wherein:
    the canopy flap has an end; and
    the end of the canopy flap has a fastening means located thereon.

7. The golf cart club bag protection device of claim 6 wherein:
the fastening means located on the end of the canopy flap is snaps.

8. The golf cart club bag protection device of claim 5 wherein:
the at least one canopy fastener is a strip of fabric;
the strip of fabric has an end; and
the end of the strip of fabric has a snap attached thereon.

9. The golf cart club bag protection device of claim 2 wherein:
the design of the attachment bar lies in a first plane and a second plane;
the first plane is vertical and the second plane is horizontal;
the design of the attachment bar lying in the first plane has two sets of bars forming a ninety degree angle;
each set of bars forming a ninety degree angle having a first and second end;
the first end being attached to the inner leg side;
the attachment bar lying in the second plane is U-shaped having ends; and
the ends of the attachment bar lying in the second plane attaches to the second ends of the bars forming a ninety degree angle in the first plane.

10. The golf cart club bag protection device of claim 1 wherein:
two canopy support bars are pivotally attached to the securing frame.

11. The golf cart club bag protection device of claim 1 wherein:
the means for attaching the canopy to the securing frame is hook and loop type fastening material.

12. The golf cart club bag protection device of claim 11 further comprising:
a means for attaching the canopy to the at least one canopy support bar.

13. The golf cart club bag protection device of claim 12 wherein:
the means for attaching is hook and loop type fastening material.

14. The golf cart club bag protection device of claim 1 wherein:
the canopy has at least one edge which is transparent.

15. The golf cart club bag protection device of claim 1 wherein:
the canopy has at least one side which is transparent.

* * * * *